United States Patent
Coenjarts et al.

(10) Patent No.: US 7,297,380 B2
(45) Date of Patent: Nov. 20, 2007

(54) LIGHT-DIFFUSING FILMS, BACKLIGHT DISPLAY DEVICES COMPRISING THE LIGHT-DIFFUSING FILMS, AND METHODS OF MAKING THE SAME

(75) Inventors: Christopher A. Coenjarts, Evansville, IN (US); Jianbo Di, Evansville, IN (US); John Graf, Ballston Lake, NY (US); Emine Elif Gurel, Evansville, IN (US); David L. Hartter, Pittsfield, MA (US); Grant Hay, Evansville, IN (US); Todd M. Loehr, Evansville, IN (US); Philip M. Peters, Mt. Vernon, IN (US); Joseph A. Riello, Jr., Pittsfield, MA (US); Shixiong Zhu, Evansville, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/133,983

(22) Filed: May 20, 2005

(65) Prior Publication Data

US 2006/0263545 A1 Nov. 23, 2006

(51) Int. Cl.
*G02B 1/04* (2006.01)
*G02B 5/02* (2006.01)

(52) U.S. Cl. .................. 428/1.3; 428/1.1; 428/323; 428/327; 428/332; 349/64; 349/112; 359/452; 359/453; 359/599

(58) Field of Classification Search .................. 428/1.1, 428/13, 323, 327, 332; 349/64, 112; 359/452–456, 359/599
See application file for complete search history.

(56) References Cited

U.S. PATENT DOCUMENTS

| 3,594,264 A | * | 7/1971 | Urban ........................ 428/339 |
| 3,635,895 A | | 1/1972 | Kramer |
| 3,945,979 A | * | 3/1976 | Kobayashi et al. ......... 524/242 |
| 4,001,184 A | | 1/1977 | Scott |
| 4,066,611 A | | 1/1978 | Axelrod |

(Continued)

FOREIGN PATENT DOCUMENTS

EP 0269324 A2 6/1988

(Continued)

OTHER PUBLICATIONS

Excerpt from JIS (Japanese Industrial Standards); JIS B 0601 (1994), Surface Roughness; 1 page 1381-1382.

(Continued)

*Primary Examiner*—Rena Dye
*Assistant Examiner*—Sow-Fun Hon
(74) *Attorney, Agent, or Firm*—Cantor Colburn LLP (57) ABSTRACT

A light-diffusing film comprises about 90 wt. % to about 99.999 wt. % polycarbonate, wherein the polycarbonate comprises a yellowness index of about 0.8 to about 1.5 as measured in accordance with ASTM E313-73 (D1925); about 0.001 wt. % to about 3 wt. % light-diffusing particles; wherein weight percents are based on a total weight of the light-diffusing film; and wherein the light-diffusing film comprises a light transmission of about 45% to about 65% as measured in accordance with ASTM D1003-00, and a hiding power of 0 to about 0.5.

22 Claims, 2 Drawing Sheets

U.S. PATENT DOCUMENTS

| | | | |
|---|---|---|---|
| 4,118,370 A | 10/1978 | Sannes et al. | |
| 4,217,438 A | 8/1980 | Brunelle et al. | |
| 5,237,004 A | 8/1993 | Wu et al. | |
| 5,352,747 A | 10/1994 | Ohtsuka et al. | |
| 5,717,057 A * | 2/1998 | Sakashita et al. | 528/198 |
| 6,376,078 B1 * | 4/2002 | Inokuchi | 428/403 |
| 6,417,831 B2 * | 7/2002 | Kashima | 345/102 |
| 6,518,340 B1 * | 2/2003 | Fishburn et al. | 524/195 |
| 6,556,347 B1 * | 4/2003 | Murayama et al. | 359/453 |
| 6,624,993 B1 | 9/2003 | Boenig et al. | |
| 6,664,313 B2 | 12/2003 | Hirai et al. | |
| 6,773,787 B2 | 8/2004 | Maas et al. | |
| 6,908,202 B2 | 6/2005 | Graf et al. | |
| 7,098,263 B2 | 8/2006 | Mitsunaga et al. | |
| 2003/0108710 A1 | 6/2003 | Coyle et al. | |
| 2004/0114228 A1 | 6/2004 | Jinno et al. | |
| 2004/0228141 A1 | 11/2004 | Hay et al. | |
| 2005/0215750 A1 | 9/2005 | Koga et al. | |
| 2005/0277713 A1 | 12/2005 | Pearson et al. | |

FOREIGN PATENT DOCUMENTS

| | | |
|---|---|---|
| EP | 0634445 A1 | 1/1995 |
| EP | 1635196 A1 | 3/2006 |
| JP | 2003-001915 | 1/2003 |
| WO | 2006/026743 A1 | 3/2006 |

OTHER PUBLICATIONS

International Search Report; International Application No. PCT/US2006/019153; International Filing Date: May 17, 2006; Date of Mailing: Jan. 15, 2007; 8 pages.

Standard Practice for Accelerated Testing for Color Stability of Plastics Exposed to Indoor Office Environments, ASTM D 4674-02a, (2002).

Standard Test Method for Haze and Luminous Transmittance of Transparent Plastics, ASTM D 1003-00, (2000).

Standard Practice for Calculating Yellowness and Whiteness Indices from Instrumentally Measured Color Coordinates, ASTM E 313-00, (2001).

* cited by examiner

LIGHT-DIFFUSING FILMS, BACKLIGHT DISPLAY DEVICES COMPRISING THE LIGHT-DIFFUSING FILMS, AND METHODS OF MAKING THE SAME

BACKGROUND

In many backlight display devices, for example in liquid crystal display televisions (LCD TV), there is a demand for larger and larger displays. As the size of a display increases, the number of light sources (e.g., a cold cathode fluorescent lamp (CCFL)) used to backlight the display can also increase. Accordingly, the backlight display system can desirably comprise a light-diffusing film (also referred to as a light-diffusing sheet, a plate, and the like). Examples of the utility of the light-diffusing film includes, but is not limited to, hiding the light and dark pattern that can be created by an array of CCFLs, hiding injection molded patterns or printing on a light guide of the display device, providing uniformity in illumination, and the like.

Accordingly, a continual need exists in the art for improved light-diffusing devices, especially those light-diffusing films employed in LCD TVs.

SUMMARY

Disclosed herein are light-diffusing films, backlight display devices comprising the light-diffusing films, and methods of making the same.

One embodiment of a light-diffusing film comprises about 90 wt. % to about 99.999 wt. % polycarbonate, wherein the polycarbonate comprises a yellowness index of about 0.8 to about 1.5 as measured in accordance with ASTM E313-73 (D1925); about 0.001 wt. % to about 3 wt. % light-diffusing particles; wherein weight percents are based on a total weight of the light-diffusing film; and wherein the light-diffusing film comprises a light transmission of about 45% to about 65% as measured in accordance with ASTM D1003-00, and a hiding power of 0 to about 0.5.

Another embodiment of a light-diffusing film comprises about 90 wt. % to about 99.999 wt. % polycarbonate comprising a yellowness index of about 0.8 to about 1.5 as measured in accordance with ASTM E313-73 (D1925); and about 0.001 wt. % to about 3 wt. % light-diffusing particles comprising polyalkyl silsesquioxane, wherein the alkyl group is selected from the group consisting of methyl, a C12 to C18 alkyl, hydride, phenyl, vinyl, and cyclohexyl, and a combination comprising at least one of the foregoing, wherein the light-diffusing particles have an average particle size of less than or equal to about 5 micrometers and have a refractive index of about 1.3 to about 1.7 when measured at a wavelength of 589 nanometers; and wherein weight percents are based on a total weight of the light-diffusing film.

One embodiment of a backlight display device comprises a liquid crystal display; a light source disposed in optical communication with the liquid crystal display; and a light-diffusing film disposed between the liquid crystal display and the light source, wherein the light-diffusing film comprises about 90 wt. % to about 99.999 wt. % polycarbonate, wherein the polycarbonate comprises a yellowness index of about 0.8 to about 1.5 as measured in accordance with ASTM E313-73 (D1925); about 0.001 wt. % to about 3 wt. % light-diffusing particles; and wherein the light-diffusing film comprises a light transmission of about 45% to about 65% as measured according to ASTM D1003-00 and a hiding power of 0 to about 0.5, and wherein weight percents are based on a total weight of the light-diffusing film.

One embodiment of a method of making a light-diffusing film comprises mixing a powdered polycarbonate and light-diffusing particles to form a mixture; melting the mixture to form a melt; and extruding the melt in the form of a sheet to form the light-diffusing film, wherein the light-diffusing film comprises a light transmission of about 45% to about 65% as measured according to ASTM D 1003-00 and a hiding power of about 0 to 0.5.

The above-described and other features will be appreciated and understood by those skilled in the art from the following detailed description, drawings, and appended claims.

BRIEF DESCRIPTION OF THE DRAWINGS

Refer now to the figures, which are exemplary embodiments, and wherein the like elements are numbered alike.

DETAILED DESCRIPTION

Disclosed herein are optical films, more particularly light-diffusing films comprising polycarbonate and light-diffusing particles (e.g., polymethyl silsesquioxane), wherein the light-diffusing film comprises a light transmission of about 45% to about 65% as measured in accordance with ASTM D1003-00 measured with instrument Macbeth 7000A, D65 light source illuminant, 10° observer, CIE (Commission Internationale de L'Eclairage) (1931), and SCI (specular component included). As will be explained in greater detail below, it has been discovered that light-diffusing films comprising the formulations disclosed herein can have increased luminance and/or improved "hiding power" compared to current commercially available light-diffusing films (e.g., compared to PC1311-50 available from Teijin Chemical Ltd. of Japan), thereby providing a significant commercial advantage. Furthermore, the light-diffusing films are a solid unitary film characterized by the absence of multiple layers. Stated another way, the light-diffusing film can be a single layer light-diffusing film.

The color shift of the light-diffusing film after 1000 hour (hr) ultraviolet (UV) accelerated weathering according to ASTM D4674 method 3 is dx less than (<) 0.0005 and dy less than (<) 0.0006, where dx is the shift in x chromaticity coordinate and dy is the shift from y chromaticity coordinate as measured with instrument Macbeth 7000A, D65 light source illuminant, 10° observer, CIE (Commission Internationale de L'Eclairage) (1931), and SCI (specular component included).

While the light-diffusing films are particularly suited for use in liquid crystal display televisions (LCD TVs), it is to be understood that any reference to LCD TVs throughout this disclosure is made merely for ease in discussion and it is to be understood that other devices and applications are envisioned to be within the scope of this disclosure. For example, the light-diffusing film can be employed in any backlight device such as LCD TVs, laptop computers, and the like.

Figure 1:
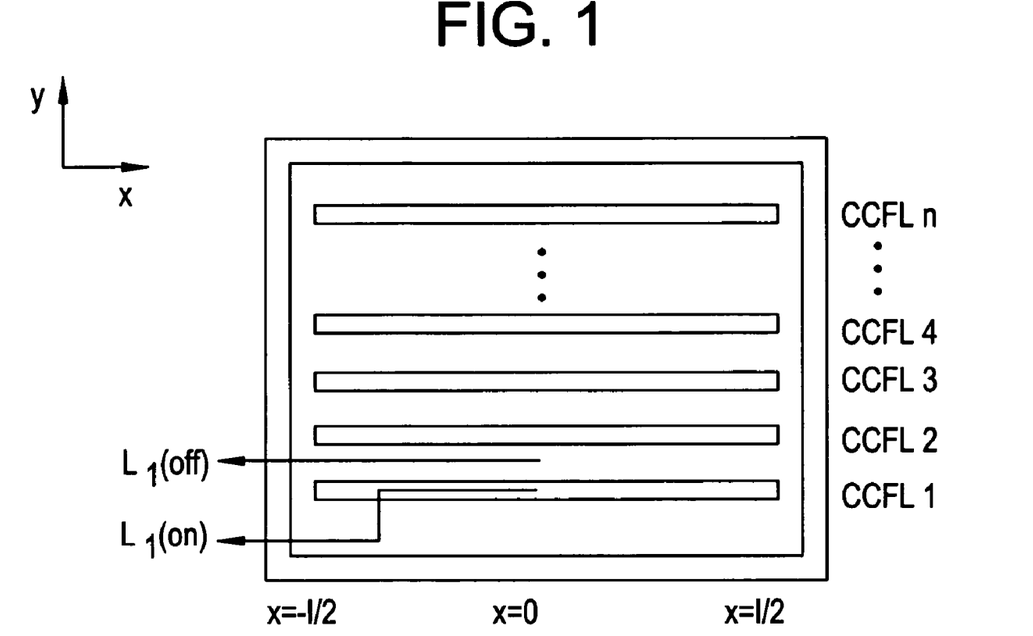
FIG. 1 is a cross sectional view of a linear array of cold cathode fluorescent lamps (CCFLs).

The term "hiding power" as used herein refers to the ability of light-diffusing films to mask the light and dark pattern produced by, for example, a linear array of fluorescent lamps (e.g., cold cathode fluorescent lamps). Quantitatively, hiding power can be mathematically described by FIG. 1 and the following equation:

$$\text{Hiding power}(\%) = \left| 1 - \frac{\sum_{i=1}^{n-1} L_i(\text{on})}{\sum_{j=1}^{n-1} L_j(\text{off})} \right| \times 100$$

where:

$L_i$ (on)=Luminance above ith CCFL $L_j$ (off)=Luminance at the midpoint between lamp j and lamp j+1 n: number of CCFL lamps

The point between adjacent CCFLs is relatively darker in comparison to the point above a CCFL. By way of example, the terms L (on) and L (off) and CCFL are shown in FIG. 1 in relation to a cross sectional view of an array of CCFLs. Luminance values that are used to calculate hiding power ($L_i$(on) and $L_j$(off)) are measured along the points on vertical y axis, where x coordinate is equal to 0, where "l" is the length of CCFL lamp as shown in FIG. 1. The average luminance is defined in relation to a 13 points test determined per Video Electronic Standard Association (VESA) flat panel display measurements (FPDM) version 2.

For example, the light-diffusing film can comprise a hiding power of 0 to 0.5, more particularly a hiding power of 0 to about 0.3 when calculated by the above described mathematical formula for hiding power and using the 13 points for average luminance measured using a BM-7 Topcon instrument.

The terms "first," "second," and the like herein do not denote any order or importance, but rather are used to distinguish one element from another, and the terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). Furthermore, all ranges disclosed herein are inclusive and combinable (e.g., ranges of "up to about 25 weight percent (wt. %), with about 5 wt. % to about 20 wt. % desired, and about 10 wt. % to about 15 wt. % more desired," is inclusive of the endpoints and all intermediate values of the ranges, e.g., "about 5 wt. % to about 25 wt. %, about 5 wt. % to about 15 wt. %," etc.).

Figure 2:
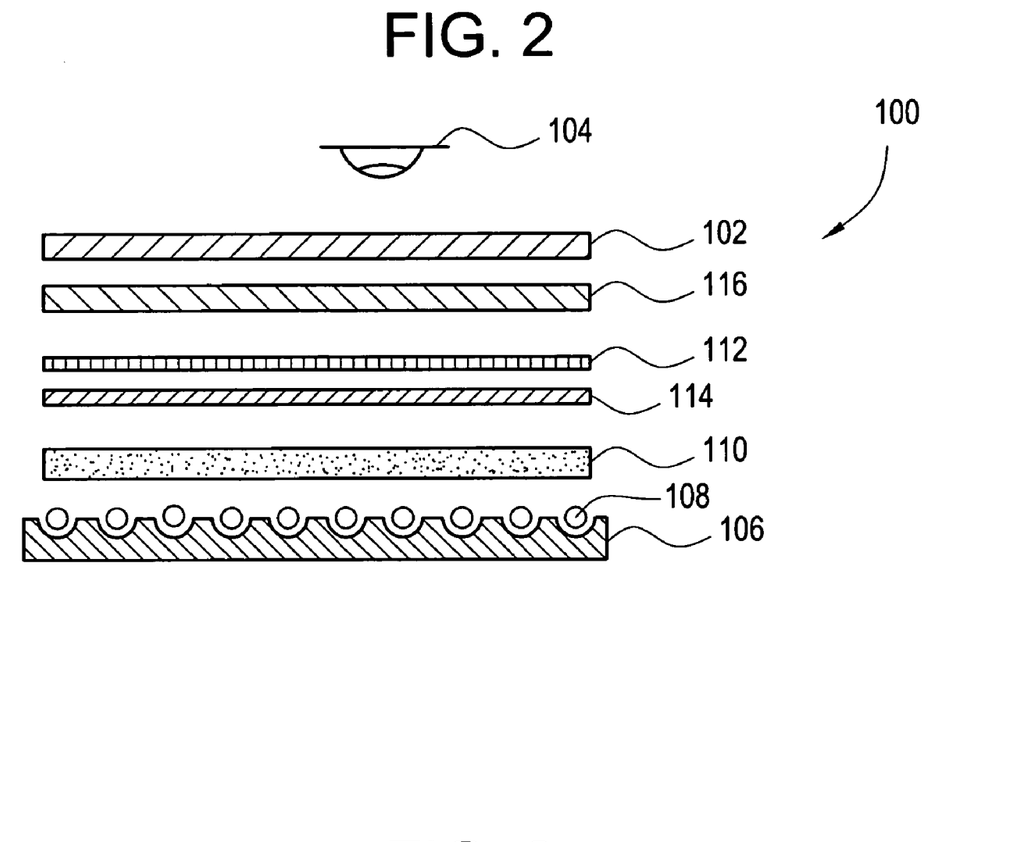
FIG. 2 is a cross sectional, exploded view of a backlight display device.

Referring now to FIG. 2, a cross sectional, exploded view of an exemplary backlight display device generally designated 100 is illustrated. The backlight display device 100 includes multiple components arranged (e.g., stacked) in various combinations depending on the desired application. Generally, the backlight display device 100 can comprise two outer components with varying components disposed between the two outer components. For example, the backlight display device 100 can comprise a liquid crystal display (LCD) 102 defining an outer side closest to a viewer 104 of the backlight display device 100 and a reflective film 106 defining the second outer side. A light source 108 for generating light can be disposed between the LCD 102 and the reflective film 106, wherein the light source 108 can be in physical communication and/or optical communication with the reflective film 106. A light-diffusing film 110 can be disposed between the LCD 102 and the reflective film 106 such that the light-diffusing film 110 can be in physical communication and/or optical communication with the light source 108. The backlight display device 100 can further include optional films 112, 114 disposed between the light source 108 and the LCD 102. Suitable optional films include, but are not limited to, brightness enhancement films (BEFs), light-diffusing films, and/or a combination comprising at least one of the foregoing. Additionally, an optional brightness enhancement (BEF) film 116 can be disposed between the LCD 102 and the light-diffusing film 110.

The number and arrangement of additional components (e.g., optional films 112, 114) can vary depending on the desired application. For example, films are envisioned that can act as both a light-diffusing film and as a brightness enhancement film, which can reduce the total number of films employed in the backlight display device 100.

The number of light source(s) 108 can vary depending on the desired application and the size of the backlight display device 100. The light source 108 can include any light source suitable to backlight the LCD 102. Suitable light sources include, but are not limited to, fluorescent lamps (e.g., cold cathode fluorescent lamps (CCFLs)) and light-emitting diodes.

The reflective film 106 includes a reflective material that is adapted to reflect light and can take many forms (e.g., a planar shape, such as a plate, a sheet, and the like). For example, suitable reflective materials include, but are not limited to, metals (e.g., aluminum and silver), thermoplastic materials (e.g., Spectralon® (available from Labsphere, Inc.) or titanium-oxide pigmented Lexan® (available from General Electric Co.)), and the like.

The brightness enhancement film 116 can use light-directing structures (e.g., prismatic structures) to direct light along the viewing axis (i.e., normal to the display), which enhances the brightness of the light viewed by the user (e.g., viewer 104) of the display and which allows the system to use less power to create a desired level of on-axis illumination. For example, the brightness enhancement film can include those structures and materials discussed in U.S. patent application Ser. No. 2003/0108710 to Coyle et al. Advantageously, it has been discovered that the light-diffusing film 110 can comprise superior luminance and hiding power compared to present commercially available light-diffusing films. The light-diffusing films 110 comprise polycarbonate and a sufficient amount of light-diffusing particles to impart the desired luminance and hiding power.

The terms "polycarbonate" and "polycarbonate resin" means compositions having repeating structural carbonate units of the formula (1):

(1)

in which at least 60 percent of the total number of $R^1$ groups are aromatic organic radicals and the balance thereof are aliphatic, alicyclic, or aromatic radicals. In one embodiment, each $R^1$ is an aromatic organic radical and, preferably, a radical of the formula (2):

(2)

where each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, which includes dihydroxy compounds of formula (3)

$$HO\text{—}A^1\text{—}Y^1\text{—}A^2\text{—}OH \quad (3)$$

wherein $Y^1$, $A^1$ and $A^2$ are as described above. Also included are bisphenol compounds of general formula (4):

(4)

wherein $R^a$ and $R^b$ each represent a halogen atom or a monovalent hydrocarbon group and may be the same or different; p and q are each independently integers of 0 to 4; and $X^a$ represents one of the groups of formula (5):

(5)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the dihydroxy-substituted hydrocarbons disclosed by name or formula (generic or specific) in U.S. Pat. No. 4,217,438. A nonexclusive list of specific examples of suitable dihydroxy compounds includes the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as mixtures comprising at least one of the foregoing dihydroxy compounds.

A nonexclusive list of specific examples of the types of bisphenol compounds that are represented by formula (3) includes 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and combinations comprising at least one the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)ethyl)alpha, alpha-dimethyl benzyl)phenol), 4-chloroformyl phthalic anhydride, trimesic acid, and benzophenone tetracarboxylic acid. The branching agents are added at a level of about 0.05 wt. % to about 2.0 wt. %. Branching agents and procedures for making branched polycarbonates are described in U.S. Pat. Nos. 3,635,895 and 4,001,184. All types of polycarbonate end groups are contemplated as being useful in the polycarbonate composition.

"Polycarbonates" and "polycarbonate resins" as used herein further includes copolymers or blends of polycarbonates with other copolymers comprising carbonate chain units. A specific suitable copolymer is a polyestercarbonate, also known as a copolyester-polycarbonate. Such copolymers further contain, in addition to recurring carbonate chain units of the formula (1), repeating units of formula (6)

(6)

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T is a divalent radical derived from a dicarboxylic acid, and is, for example, a $C_{2-10}$ alkylene radical, a $C_{6-20}$ alicyclic radical, a $C_{6-20}$ alkyl aromatic radical, or a $C_{6-20}$ aromatic radical.

Without being bound by theory, the yellowness index (YI) of the polycarbonate resin can be a factor that contributes to obtaining the desired luminance and hiding power of the light-diffusing film 110. The polycarbonate can have a yellowness index sufficient to provide the desired properties to the light-diffusing film 110. For example, polycarbonate resin can have a yellowness index of about 0.8 to about 1.5, particularly about 0.9 to about 1.3, as measured in accordance with ASTM E313-73 (D1925).

In an embodiment, the polycarbonate can be present in an amount sufficient to act as a matrix for the light-diffusing particles of the light-diffusing film 110. For example, the polycarbonate can be present in an amount of about 90 weight percent (wt. %) to about 99.999 wt. % based on a total weight of the light-diffusing film 110. Particularly, the light-diffusing film 110 can comprise about 94 wt. % to about 99.999 wt. % polycarbonate, even more particularly about 98 wt. % to about 99.800 wt. % polycarbonate, based on the total weight of the light-diffusing film.

Suitable light-diffusing particles of the light-diffusing film 110 can comprise polyorgano silsesquioxanes. Suitable examples of polyorgano silsesquioxanes include, but are not limited to, polyalkyl silsesquioxanes, wherein the alkyl groups can be methyl, C2 to C18 alkyl, hydride, phenyl, vinyl, cyclohexyl, or combinations comprising at least one of the foregoing. Examples can include, but are not limited to, polymethyl silsesquioxanes, polyphenyl silsesquioxanes, polyphenyl-methyl silsesquioxanes, a phenyl silsesquioxane-dimethyl siloxane copolymers in liquid form, polyphenyl-vinyl silsesquioxanes, polycyclohexyl silsesquioxanes, polycyclopentyl silsesquioxanes, and polyhydride silsesquioxanes. In a particular embodiment, all of the light-diffusing particles are polymethyl silsesquioxane.

In yet other embodiments, the light-diffusing particles can be acrylic based and include poly(acrylates); poly(alkyl methacrylates), for example, poly(methyl methacrylate) (PMMA); and mixtures comprising at least one of the foregoing organic materials, wherein the alkyl groups have one to about twelve carbon atoms. More particularly, the light-diffusing particles can include cross-linked PMMA. In yet other embodiments, the PMMA can be cross-linked with another copolymer (e.g., polystyrene).

In one embodiment, the light-diffusing particles can have an average particle size of less than or equal to about 5 micrometers, wherein each particle used in calculating the average particle size is measured across a major diameter (i.e., the longest diameter)) of a given particle. Particularly, the light-diffusing particle can have an average particle size of less than or equal to about 2 micrometers. In another embodiment, the light-diffusing particles can have an average particle size of about 1 micrometer to about 3 micrometers.

The particles can vary in shape and size. Suitable particle shapes include, but are not limited to, spherical, elliptical (sometimes referred to as biconvex lens shaped), and the like. Further, the particles can be solid or hollow.

With regards to the refractive index, the light-diffusing particles can have a refractive index of about 1.3 to about 1.7, more specifically about 1.40 to about 1.53 when measured at the Sodium D line with a wavelength of 589 nm.

The light-diffusing particle can be present in a sufficient amount to impart the desired properties to the light-diffusing film (e.g., the desired luminance, hiding power, and transmission). In one embodiment, the light-diffusing film can be present in an amount of about 0.001 wt. % to about 3 wt. %. Particularly, the light-diffusing particles can be present in an amount of about 0.2 wt. % to about 2 wt. %, and even more particularly about 0.2 wt. % to about 1 wt. %, wherein weight percents are based on a total weight of the light-diffusing film.

The composition used in the light-diffusing film can further include various additives. Suitable additives include, but are not limited to, impact modifiers, fillers, heat stabilizers, light stabilizers, antioxidants, mold release agents, lubricants, flame retardants, anti-drip agents, optical brighteners, and combinations comprising at least one of the foregoing. The additives can be present in an amount effective to impart the desired effect to the light-diffusing film. For example, the additive can be present in an amount of about 0.001 wt % to about 10 wt. % based on a total weight of the light-diffusing film.

For example, suitable optical brighteners include, but are not limited to, derivatives of 4,4' bis(2-benzoxazolyl)stilbene, and 4,4'-diaminostilbene-2,2'-disulfonic acid, coumarin derivatives such as 4-methyl-7-diethylaminocoumarin, 1,4-bis(O-cyanostyryl)benzol, and 2-amino-4-methylphenol. Optical brighteners can be present in an amount of about 0.001 wt. % to about 3.0 wt. % based on a total weight of the light-diffusing film.

While the thickness of the light-diffusing film can vary depending on the desired application. For LCD TV applications, it has been discovered that the desired hiding power and luminance can be obtained when the light-diffusing film has a thickness of about 1.0 millimeters to about 4.0 millimeters, particularly about 1.4 millimeters to about 3 millimeters, and even more particularly a thickness of about 1.8 millimeters to about 2.2 millimeters.

In various embodiments, the light-diffusing film can have a polished surface, a textured surface, or a combination comprising at least one of the foregoing. More particularly, the light-diffusing film can comprise any surface texture that can provide the desired ease in handling and provides the desired cosmetic effect. For example, the light-diffusing film can have a surface roughness (Ra) of about 0.01 micrometer to about 2 micrometers, particularly a surface roughness of about 0.25 micrometers to about 0.65 micrometers, wherein surface roughness values are measured in accordance with Japanese Industrial Standards (JIS B0601) as measured using a Kosaka ET4000 Surface profilometer. Surface roughness (Ra) is a term readily understood by those skilled in the art. Generally, the Ra is a measure of the average roughness of the film. It can be determined by integrating the absolute value of the difference between the surface height and the average height and dividing by the measurement length for a one dimensional surface profile, or the measurement area for a two dimensional surface profile.

As briefly mentioned above, the light-diffusing film can be a solid unitary film characterized by the absence of multiple layers. Advantageously, by making a film that is a unitary structure that does not comprise multiple layers, the overall cost of the light-diffusing film can be reduced compared to a film that comprises multiple layers. Additionally, in various embodiments, the light-diffusing film can be a solid sheet, which again can reduce the cost of manufacturing compared to a film including multiple layers. Further, a solid sheet light-diffusing film can eliminate problems including delamination, lack of adhesion between coextruded layers, coating cracking, and the like that are associated with multiple layer structures.

It has also been discovered that extruded films made using polycarbonate powder can aid in imparting the desired properties to the light-diffusing film. For example, in making the light-diffusing film, the polycarbonate powder, the light-diffusing particles, and any other additives that may be desired for one particular application, can be mixed and disposed in a hopper of an extruder.

Further, in various embodiments, the light-diffusing film does not comprise any dyes or colorants to obtain a neutral or white color. It has been discovered that dyes and/or colorants can adversely affect luminance (e.g., up to a 10% drop in luminance can be observed when using a color additive). Rather, a white color can be generated by the light-diffusing particles and the yellowness index of the polycarbonate.

EXAMPLES

In the following examples, light-diffusing films were produced by the following process (Table 1) Masterbatch resin was pre-dried at 250° F. (degrees Fahrenheit) (about 121° C. (degrees Celsius)) overnight.

Figure 3:
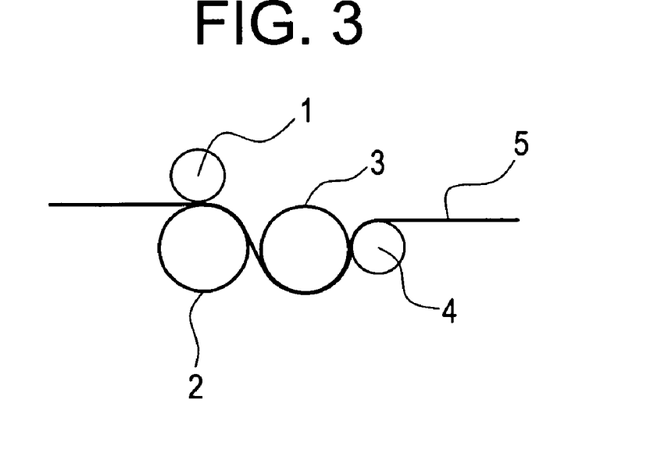
FIG. 3 is a schematic illustration of a roll configuration used in making an extruded film.

Cleaning was performed on the entire line before making the light-diffusing film. The roll configuration illustrated in FIG. 3 was employed. In this example, four rolls were used, as illustrated in FIG. 3 respectively with reference numerals 1 (for Roll 1), 2 (for Roll 2), 3 (for Roll 3), and 4 (Roll 4). Rolls 1 and 4 each had polish roll surface, while Rolls 2 and 3 had a matte roll surface. The extruded sheet was designated by reference number 5.

Polycarbonate resin was run through the line for about 3 to 5 hours to purge any black specs and the like from the extruder. At the end of purging, a detailed visual inspection was observed on the film obtained from General Electric (GE) Silicones under the trade name Tospearl. The refractive index of the Tospearl was reported to be 1.42. The average particle size and concentration of the polymethyl silsesquioxane were varied.

In Table 2, the average particle size and concentration of the polymethyl silsesquioxane was varied and the luminance gain and hiding power for each light-diffusing film composition was compared relative to a commercially available light-diffusing film (PC1311-50 available from Teijin Chemical Ltd. of Japan). PC1311-50 was a polycarbonate film comprising about 3.5 wt. % acrylate particles, wherein the weight percents were based on a total weight of the film. The PC1311-50 film had a thickness of about 2 millimeters and a transmission of 50.4%. The luminance gain relative to PC1311-50 was measured using the 13 points test described above (measured using a Topcon BM-7 instrument), while the hiding power was calculated as described above. The backlight module film stack configuration used in these measurements comprised a polycarbonate light-diffusing film at the bottom and 2 bottom diffusers (coated polyethylene terephthalate (PET) films with 0.127 mm thickness each, sold as D121 films by Tsujiden Co., Ltd.) as the top layer. No brightness enhancement films (BEF) or dual brightness enhancement films (DBEF) were employed in this measurement configuration. It was noted that the optimum performance for luminance and hiding power (as measured and discussed above) for this set of data was obtained by particles with an average size of 2 micrometers at 0.5 wt. % in polycarbonate as shown in Example 6 in Table 2.

TABLE 1

| Die Z1 (° F.) | Die Z2 (° F.) | Die Z3 (° F.) | Die Z4 (° F.) | Die Z5 (° F.) | Extruder speed (rpm) | Extr Z1 (° C.) | Extr Z2 (° C.) |
|---|---|---|---|---|---|---|---|
| 569 | 539 | 554 | 561 | 578 | 139 | 280 | 280 |

| Extr Z3 (° C.) | Extr Z4 (° C.) | Extr (° C.) | Tor (%) | Lwf A | Lwf C | Output/hr | Line speed (meter/min) |
|---|---|---|---|---|---|---|---|
| 280 | 200 | 200 | 80 | 90 | 10 | 450 | 2.23 |

| Ratio Roll 1 | Ratio Roll 3 | Scrp Z1 (° F.) | Scrp Z2 (° F.) | Temp R1 (° C.) | Temp R2 (° C.) | Temp R3 (° C.) | Temp R4 (° C.) |
|---|---|---|---|---|---|---|---|
| 1.01 | 1.02 | 430 | 430 | 80 | 147 | 158 | 154 |

Die Z1-Z5: temperatures of Zone 1-Zone 5
Extr Z1-Z5: Extrusion temperatures Zone 1-Zone 5
LWF(A): Weight fraction in hopper A (polycarbonate (PC) powder)
LWF (C): Weight fraction in hopper C (master batch)
Ratio Roll 1 and Ratio Roll 3: Ratio Roll 1 was the ratio of Roll 1 surface speed to Master Roll (i.e., Roll 2) surface speed, while Ratio Roll3 was the ratio of Roll 3 surface speed to Master Roll surface speed.
Scrp Z1: Screenpack temperatures Z1 to Z2
Temp R1 to R4: Temperatures of each roll (Rolls 1-4)

The masterbatch resin (See Table 3) was loaded into a hopper (hopper C for convenience in discussion) and PC powder into another hopper (hopper A for convenience in discussion). The flow rate of masterbatch resin was controlled to around 10% of the total flow rate. The transmission value of the diffuser sheet was measured against the specifications during the run. The transmission value of the sheet was adjusted in situ by varying the ratio of masterbatch loading to PC powder loading as necessary.

The resulting light-diffusing films were cut into 2.05 meter×1.25 meter samples having a thickness of 2 millimeters. The light-diffusing particles employed in making the light-diffusing films were a polymethyl silsesquioxane

TABLE 2

| Example No. | Particle size (micrometers) | Concentration (Wt. % in polycarbonate) | Luminance gain (relative to PC1311-50) | Hiding power |
|---|---|---|---|---|
| 1 | 1 | 0.35 | 93.90 | 0.13 |
| 2 | 1 | 0.50 | 92.80 | 0.03 |
| 3 | 1 | 0.65 | 91.00 | 0.11 |
| 4 | 1 | 0.80 | 89.90 | 0.07 |
| 5 | 2 | 0.35 | 98.90 | 1.18 |
| 6 | 2 | 0.50 | 97.00 | 0.73 |

TABLE 2-continued

| Example No. | Particle size (micrometers) | Concentration (Wt. % in polycarbonate) | Luminance gain (relative to PC1311-50) | Hiding power |
|---|---|---|---|---|
| 7 | 2 | 0.65 | 92.20 | 0.20 |
| 8 | 2 | 0.80 | 96.00 | 0.32 |
| 9 | 3 | 0.70 | 98.00 | 0.46 |
| 10 | 3 | 1.00 | 96.20 | 0.09 |
| 11 | 3 | 1.30 | 95.70 | 0.09 |
| 12 | 4.5 | 1.60 | 94.50 | 0.40 |
| 13 | 4.5 | 1.90 | 93.60 | 0.35 |
| 14 | 4.5 | 2.20 | 93.70 | 0.14 |

For Examples 15-18, the formulation disclosed below in Table 3 was used in the light-diffusing film, wherein the light-diffusing particles were polymethyl silsesquioxane having an average particle size of 2 micrometers, obtained from General Electric (GE) Silicones under the trade name Tospearl 120. The extrusion process explained above was used to manufacture a light-diffusing film, which was cut to the above described sample sizes. In Examples 15-18, the yellowness index of the polycarbonate resin was varied.

TABLE 3

| Commercial Name | Chemical Name | Wt. % based on masterbatch | Wt. % based on total weight of sheet |
|---|---|---|---|
| Lexan | Polycarbonate | 91.39 | 93.319 |
| Cyasorb 5411 | 2-(2'hydroxy-5-t-octylphenyl)-benzotriazole | 2.00 | 0.020 |
| Irgafos 168 | tris(2,4-di-t-butylphenyl)phosphite | 0.90 | 0.090 |
| Tospearl 120 | polymethyl silsesquioxane | 5.66 | 0.566 |
| Eastobrite-OB1 | 4,4' bis(2-benzoxazolyl)stilbene | 0.05 | 0.005 |

In Table 4, the yellowness index of the polycarbonate was varied. The average Color x and the average Color y was measured using a Topcon BM-7 instrument (CIE 1931). The delta x and delta y showed the change in each coordinate relative to PC1311-50. Also shown in Table 4 was the 13 points average luminance measured in candela per squared meter ($cd/m^2$), the luminance gain (relative to PC1311-50), and the hiding power. The 13 point average luminance was greater than or equal to about 6,000 candela per square meter, and hiding power as reported when measured on a backlight module comprising 12 CCFLs, which were 500 millimeters (mm) in length, 3 mm diameter, and located 23 mm apart. Distance to the light-diffusing film was 12 mm. Input voltage to the power inverter was 24 volts.

TABLE 4

| Example No. | Resin YI | Avg. Color x | Avg. Color y | Delta x | Delta y | 13 points average luminance $cd/m^2$ | Luminance gain (relative to PC1311-50) | Hiding power |
|---|---|---|---|---|---|---|---|---|
| 15 | 1.27 | 0.3018 | 0.3189 | 0.0073 | 0.0103 | 6,454 | 100.8% | 0.31 |
| 16 | 1.30 | 0.3037 | 0.3210 | 0.0092 | 0.0124 | 6,279 | 98.5% | 0.30 |
| 17 | 0.99 | 0.2970 | 0.3131 | 0.0025 | 0.0045 | 6,602 | 103.4% | 0.36 |
| 18 | 1.09 | 0.2988 | 0.3148 | 0.0043 | 0.0062 | 6,533 | 102.0% | 0.16 |
| PC1311-50 | — | 0.2945 | 0.3086 | — | — | 6,405 | 100.0% | 0.44 |

The set of experiments summarized in Table 4 illustrated that the resin powder quality, determined by yellowness index (YI), is a significant parameter for making high performance light-diffusing films, wherein "high" performance was evaluated in terms of luminance gain and hiding power. It was noted that the YI less than 1.0 provides the best results for that set of data. (Example 17). More particularly, a yellowness index of 0.99 provided a luminance gain of 103.4% and a hiding power of 0.36 when compared to PC1311-50. Further, this data showed that at a yellowness index of 1.3, the film actually had a luminance less than PC1311-50. More particularly, for Example 16, the luminance was 98.5% when compared to Pci 311-50. A luminance gain of greater than or equal to 102% was obtained with YI of about 0.9 to 1.10.

In another set of tests, poly(methyl methacrylate) (PMMA) sold under the tradename Ganz pearl GM-105 having a particle size of 2.5 micrometers and the tradename Ganz pearl GM-205 having a particle size of 3.1 micrometers, each commercially available from Ganz Chemical Co., Ltd., were employed in making the light-diffusing film by the above described process. The results were summarized below in Tables 5-6. The weight percents were based on the total weight of the light-diffusing film.

TABLE 5

| Commercial Name | Chemical Name | Ex. 19 | Ex. 20 | Ex. 21 | Ex. 22 | Ex. 23 | Ex. 24 |
|---|---|---|---|---|---|---|---|
| Lexan | Polycarbonate | 99.21 | 98.46 | 97.71 | 99.21 | 98.46 | 97.71 |
| Cyasorb 5411 | 2-(2'hydroxy-5-t-octylphenyl)-benzotriazole | 0.20 | 0.20 | 0.20 | 0.20 | 0.20 | 0.20 |
| Irgafos 168 | tris(2,4-di-t-butylphenyl) phosphite | 0.09 | 0.09 | 0.09 | 0.09 | 0.09 | 0.09 |
| Ganz pearl GM-105 | poly (methyl methacrylate) | 0.50 | 1.25 | 2.00 | 0 | 0 | 0 |
| Ganz pearl GM-205 | poly(methyl methacrylate) | 0 | 0 | 0 | 0.5 | 1.25 | 2.00 |

TABLE 6

| Example No. | Luminance gain (relative to PC1311-50) | Hiding power |
|---|---|---|
| 19 | 103.4 | 3.7 |
| 20 | 100.5 | 0.5 |
| 21 | 95.7 | 0.1 |
| 22 | 106.0 | 4.5 |
| 23 | 103.2 | 2.0 |
| 24 | 102.2 | 0.4 |

In this set of examples, Examples 19 and 23 exhibited a luminance greater than PC1311-50, but the hiding power was greater than 0.5. Without being bound by theory, it was determined that at a hiding power greater than 0.5 light and dark patterns may start to be observed. Example 24 had the best combination of luminance (102.2) and hiding power (0.4). As mentioned above, any luminance gain while increasing hiding power can provide a significant commercial advantage to the light-diffusing film.

Advantageously, the light-diffusing films can have a much higher performance compared to current commercially available light-diffusing films. More particularly, the light-diffusing film can provide a 3% or greater increase in luminance (brightness) compared to PC1311-50, while having a hiding power of 0 to about 0.5, which is a significant improvement in the art. Further, it is noted that the light-diffusing film disclosed herein can be a solid unitary film characterized by the absence of multiple layers, which can advantageously reduce the overall cost and improved reliability of the light-diffusing film compared to multi-layer films that are formed by lamination, coating or co-extrusion.

While the invention has been described with reference to several embodiments thereof, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A light-diffusing film comprising:
    about 90 wt. % to about 99.999 wt. % polycarbonate, wherein the polycarbonate comprises a yellowness index of about 0.8 to about 1.5 as measured in accordance with ASTM E313-73 (D1925);
    about 0.001 wt. % to about 3 wt. % light-diffusing particles; and
    wherein weight percents are based on a total weight of the light-diffusing film;
    wherein the light-diffusing film comprises a light transmission of about 45% to about 65% as measured in accordance with ASTM D1003-00, and a hiding power of 0 to about 0.5 that is mathematically described by the following equation:

$$\text{Hiding power}(\%) = \left| 1 - \frac{\sum_{i=1}^{n-1} L_i(\text{on})}{\sum_{j=1}^{n-1} L_j(\text{off})} \right| \times 100$$

wherein: $L_i(\text{on})$ is luminance above $i^{th}$ cold cathode fluorescent lamp, $L_j(\text{off})$ is luminance at a midpoint between cold cathode fluorescent lamp j and cold cathode fluorescent lamp j+1, and n equals number of CCFL lamps; and
    wherein the light-diffusing film has a 13 points average luminance that is greater than a 13 points average luminance of a polycarbonate film, as determined by a 13 points test using a Topcon BM-7 instrument, wherein the polycarbonate film comprises about 3.5 wt % acrylate particles based on a total weight of the polycarbonate film, and the polycarbonate film has a thickness of 2 millimeters and a transmission of 50.4% as determined in accordance with ASTM D1003-00 and as measured with instrument Macbeth 7000A, D65 light source illuminant, 10° observer.

2. The light-diffusing film of claim 1, wherein the light-diffusing film comprises about 0.20 wt. % to about 2 wt. % light-diffusing particles.

3. The light-diffusing film of claim 1, wherein the light-diffusing film does not comprise any dyes or colorants.

4. The light-diffusing film of claim 1, wherein the polycarbonate comprises a yellowness index of about 0.9 to about 1.3.

5. The light-diffusing film of claim 1, wherein the light-diffusing particles comprise a polyorgano silsesquioxane.

6. The light-diffusing film of claim 1, wherein the light-diffusing particles comprise poly(methyl methacrylate).

7. The light-diffusing sheet of claim 1, wherein the light-diffusing sheet comprises an average surface roughness (Ra) of about 0.01 micrometers to about 2.0 micrometers as measured in accordance with JIS B0601.

8. The light-diffusing film of claim 1, wherein the light-diffusing film is a solid unitary film.

9. The light diffusing film of claim 1, wherein the light-diffusing film 13 points average luminance is greater than or equal to 100.8% compared to the polycarbonate film 13 points average luminance.

10. The light diffusing film of claim 9, wherein the light-diffusing film 13 points average luminance is greater than or equal to 102.0% compared to the polycarbonate film 13 points average luminance.

11. The light diffusing film of claim 1, wherein the polycarbonate was produced by an interfacial reaction.

12. A light-diffusing film comprising: about 90 wt. % to about 99.999 wt. % polycarbonate comprising a yellowness index of about 0.8 to about 1.5 as measured in accordance with ASTM E313-73 (D1925); and about 0.001 wt. % to about 3 wt. % light-diffusing particles comprising polyalkyl silsesquioxane, wherein the alkyl group is selected from the group consisting of methyl, a C12 to C18 alkyl, hydride, phenyl, vinyl, and cyclohexyl, and a combination comprising at least one of the foregoing, wherein weight percents are based on a total weight of the light-diffusing film; wherein the light-diffusing particles have an average particle size of less than or equal to about 5 micrometers and have a refractive index of about 1.3 to about 1.7 when measured at a wavelength of 589 nanometers; wherein the light-diffusing film has a hiding power of 0 to about 0.5, mathematically described by the following equation:

$$\text{Hiding power}(\%) = \left| 1 - \frac{\sum_{i=1}^{n-1} L_i(\text{on})}{\sum_{j=1}^{n-1} L_j(\text{off})} \right| \times 100$$

where $L_i(\text{on})$=Luminance above $i^{th}$ cold cathode fluorescent lamp (CCFL), $L_j(\text{off})$=Luminance at the midpoint between lamp j and lamp j+1, and n=number of CCFL lamps; and wherein the light-diffusing film has a 13 points average luminance that is greater than a 13 points average luminance of a polycarbonate film, as determined by a 13 points test using a Topcon BM-7 instrument, wherein the polycarbonate film comprises about 3.5 wt % acrylate particles based on a total weight of the polycarbonate film, and the polycarbonate film has a thickness of 2 millimeters and a transmission of 50.4%, as determined in accordance with ASTM D1003-00 and as measured with instrument Macbeth 7000A, D65 light source illuminant, 10° observer.

13. The light-diffusing film of claim 12, wherein the light-diffusing film does not comprise any dyes or colorants.

14. The light-diffusing film of claim 12, wherein the polycarbonate comprises a yellowness index of about 0.9 to about 1.3.

15. A backlight display device, comprising:
a liquid crystal display;
a light source disposed in optical communication with the liquid crystal display; and
a light-diffusing film disposed between the liquid crystal display and the light source, wherein the light-diffusing film comprises
about 90 wt. % to about 99.999 wt. % polycarbonate, wherein the polycarbonate comprises a yellowness index of about 0.8 to about 1.3 as measured in accordance with ASTM E313-73 (D1925); and
about 0.001 wt. % to about 3 wt. % light-diffusing particles;
wherein weight percents are based on a total weight of the light-diffusing film;
wherein the light-diffusing film comprises a light transmission of about 45% to about 65% as measured according to ASTM D 1003-00 and a hiding power of 0 to about 0.5 that is mathematically described by the following equation:

$$\text{Hiding power}(\%) = \left| 1 - \frac{\sum_{i=1}^{n-1} L_i(\text{on})}{\sum_{j=1}^{n-1} L_j(\text{off})} \right| \times 100$$

wherein: $L_i(\text{on})$ is luminance above $i^{th}$ cold cathode fluorescent lamp, $L_j(\text{off})$ is luminance at a midpoint between cold cathode fluorescent lamp j and cold cathode fluorescent lamp j+1, and n equals number of CCFL lamps; and
wherein the light-diffusing film has a 13 points average luminance that is greater than a 13 points average luminance of a polycarbonate film, as determined by a 13 points test using a Topcon BM-7 instrument, wherein the polycarbonate film comprises about 3.5 wt % acrylate particles based on a total weight of the polycarbonate film, and the polycarbonate film has a thickness of 2 millimeters and a transmission of 50.4% as determined in accordance with ASTM D1003-00 and as measured with instrument Macbeth 7000A, D65 light source illuminant, 10° observer.

16. A liquid crystal displaytelevision comprising the backlight display device of claim 15.

17. The backlight display device of claim 15, wherein the light-diffusing film does not comprise any dyes or colorants.

18. A light-diffusing film comprising:
about 90 wt. % to about 99.999 wt. % polycarbonate, wherein the polycarbonate comprises a yellowness index of about 0.8 to about 1.3 as measured in accordance with ASTM E313-73 (D1925); and
about 0.001 wt. % to about 3 wt. % light-diffusing particles;
wherein weight percents are based on a total weight of the light-diffusing film;
wherein the light-diffusing film comprises a hiding power of 0 to about 0.5 that is mathematically described by the following equation:

$$\text{Hiding power}(\%) = \left| 1 - \frac{\sum_{i=1}^{n-1} L_i(\text{on})}{\sum_{j=1}^{n-1} L_j(\text{off})} \right| \times 100$$

wherein: $L_i(\text{on})$ is luminance above $i^{th}$ cold cathode fluorescent lamp, $L_j(\text{off})$ is luminance at a midpoint between cold cathode fluorescent lamp j and cold cathode fluorescent lamp j+1, and n equals number of CCFL lamps; and
wherein the light-diffusing film has a 13 points average luminance that is greater than a 13 points average luminance of a polycarbonate film, as determined by a 13 points test using a Topcon BM-7 instrument, wherein the polycarbonate film comprises about 3.5 wt % acrylate particles based on a total weight of the polycarbonate film, and the polycarbonate film has a thickness of 2 millimeters and a transmission of 50.4% as determined in accordance with ASTM D1003-00 and as measured with instrument Macbeth 7000A, D65 light source illuminant, 10° observer.

19. A backlight display device, comprising:
a liquid crystal display;
a light source disposed in optical communication with the liquid crystal display; and
a light-diffusing film disposed between the liquid crystal display and the light source, wherein the light-diffusing film was produced from
about 90 wt. % to about 99.999 wt. % polycarbonate powder; and
about 0.001 wt. % to about 3 wt. % light-diffusing particles;
wherein weight percents are based on a total weight of the light-diffusing film;
wherein the light-diffusing film comprises a hiding power of 0 to about 0.5 that is mathematically described by the following equation:

$$\text{Hiding power}(\%) = \left| 1 - \frac{\sum_{i=1}^{n-1} L_i(\text{on})}{\sum_{j=1}^{n-1} L_j(\text{off})} \right| \times 100$$

wherein: $L_i(\text{on})$ is luminance above $i^{th}$ cold cathode fluorescent lamp, $L_j(\text{off})$ is luminance at a midpoint between cold cathode fluorescent lamp j and cold cathode fluorescent lamp j+1, and n equals number of CCFL lamps; and
wherein the light-diffusing film has a 13 points average luminance that is greater than a 13 points average luminance of a polycarbonate film, as determined by a 13 points test using a Topcon BM-7 instrument, wherein the polycarbonate film comprises about 3.5 wt % acrylate particles based on a total weight of the polycarbonate film, and the polycarbonate film has a thickness of 2 millimeters and a transmission of 50.4% as determined in accordance with ASTM D1003-00 and as measured with instrument Macbeth 7000A, D65 light source illuminant, 10° observer.

20. The device of claim 19, wherein the polycarbonate powder comprised a yellowness index of about 0.8 to about 1.3 as measured in accordance with ASTM E313-73 (D1925).

21. The device of claim 19, wherein the polycarbonate powder comprised a yellowness index of about 0.8 to about 1.3 as measured in accordance with ASTM E313-73 (D1925).

22. A backlight display device, comprising:
a liquid crystal display;
a light source disposed in optical communication with the liquid crystal display; and
a light-diffusing film disposed between the liquid crystal display and the light source, wherein the light-diffusing film was produced from
about 90 wt. % to about 99.999 wt. % polycarbonate; and
about 0.001 wt. % to about 3 wt. % light-diffusing particles;
wherein weight percents are based on a total weight of the light-diffusing film;
wherein the light-diffusing film does not comprise any dyes or colorants;
wherein the light-diffusing film comprises a hiding power of 0 to about 0.5 that is mathematically described by the following equation:

$$\text{Hiding power}(\%) = \left| 1 - \frac{\sum_{i=1}^{n-1} L_i(\text{on})}{\sum_{j=1}^{n-1} L_j(\text{off})} \right| \times 100$$

wherein: $L_i(\text{on})$ is luminance above $i^{th}$ cold cathode fluorescent lamp, $L_j(\text{off})$ is luminance at a midpoint between cold cathode fluorescent lamp j and cold cathode fluorescent lamp j+1, and n equals number of CCFL lamps; and wherein the light-diffusing film has a 13 points average luminance that is greater than a 13 points average luminance of a polycarbonate film, as determined by a 13 points test using a Topcon BM-7 instrument, wherein the polycarbonate film comprises about 3.5 wt % acrylate particles based on a total weight of the polycarbonate film, and the polycarbonate film has a thickness of 2 millimeters and a transmission of 50.4% as determined in accordance with ASTM D1003-00 and as measured with instrument Macbeth 7000A, D65 light source illuminant, 10° observer.

* * * * *